United States Patent [19]

Hugelshofer

[11] Patent Number: 4,588,412
[45] Date of Patent: May 13, 1986

[54] SOLID FORMULATIONS OF DYES WHICH ARE SPARINGLY SOLUBLE OR INSOLUBLE IN WATER

[75] Inventor: Paul Hugelshofer, Muttenz, Switzerland

[73] Assignee: Ciba-Geigy Corporation, Ardsley, N.Y.

[21] Appl. No.: 681,990

[22] Filed: Dec. 14, 1984

[30] Foreign Application Priority Data

Dec. 21, 1983 [CH] Switzerland ............ 6796/83

[51] Int. Cl.$^4$ ............................................. C09B 67/02
[52] U.S. Cl. .................................................. 8/524; 8/532; 8/589; 8/591; 8/611; 8/650; 8/918; 8/922
[58] Field of Search ........................... 8/524, 611, 650

[56] References Cited

U.S. PATENT DOCUMENTS 3,153,564 10/1964 Morgan ........................ 8/649
3,158,434 11/1964 Fleysher ........................ 8/528

Primary Examiner—A. Lionel Clingman
Attorney, Agent, or Firm—Edward M. Roberts; Kevin T. Mansfield

[57] ABSTRACT

The invention relates to solid formulations of dyes which are insoluble or sparingly soluble in water, which formulations contain a dialkyl sulfosuccinate having 3 to 8 carbon atoms in each alkyl moiety, or a $C_3$–$C_6$alkyl-naphthalenesulfonate and/or a branched or unbranched acetylene glycol containing 8 to 20 carbon atoms, in addition to the dye and one or more anionic dispersants, optionally together with further auxiliaries conventionally employed in powdered formulations.

These formulations are characterized by very good wettability, excellent dispersibility and good redispersibility. The dyebaths and padding liquors prepared with these formulation are non-foaming or only low foaming and are in addition stably disperse. They are suitable for dyeing and printing natural and synthetic fibres.

13 Claims, No Drawings

SOLID FORMULATIONS OF DYES WHICH ARE SPARINGLY SOLUBLE OR INSOLUBLE IN WATER

The present invention relates to solid formulations of dyes which are sparingly soluble or insoluble in water, to a process for their preparation, and to the use thereof for dyeing and printing natural or synthetic fibre material.

Solid formulations of dyes which are sparingly soluble or insoluble in water are known. In addition to containing the dye, these formulations normally contain a dispersant or mixture of dispersants, as well as further ingredients such as extenders, wetting agents and the like. Anionic dispersants are often used as dispersants, in some cases also in admixture with nonionic dispersants.

A whole range of widely varying requirements are made at the present time of dye formulations in view of process efficiency and substantially automated dyeing processes. Thus it is required of a commercial powder or granular formulation that it must have good dispersibility, i.e. that it can be made into a paste with, or stirred in, cold water in as short a time as possible without forming lumps. Good redispersibility is an important criterion, meaning that the formulation shall not only be readily wettable, but that the degree of dispersion of the dye when suspended in water shall correspond as far as possible to the fine dispersion attained after the preceding grinding operation. In addition, the dispersion stability in cold and hot dye liquors shall be ensured, i.e. no reduction in the degree of dispersion may occur as a result of agglomeration, aggregation or crystallisation. In addition, there shall be a minimum of foam formation in the dye or padding liquor.

To fulfill all these criteria, it is not enough solely to grind the dye in the presence of an anionic dispersant, e.g. a lignosulfonate, and then to dry the aqueous dispersion. The formulation so obtained may well have a sufficient dispersion stability, but it will not satisfy the requirements regarding wettability and foaming properties.

Accordingly, it is the object of the present invention to provide a solid dye formulation that has substantially the properties referred to at the outset as being desirable.

It has been found that an anionic dispersant, or a mixture of dispersants, is still necessary for grinding and dispersing water-insoluble and sparingly soluble dyes. In order to improve also dispersibility and wettability, the addition of a dialkyl sulfosuccinate or an alkylnaphthalenesulfonate and/or an acetylene glycol has, surprisingly, proved extremely effective without detriment to the foaming properties of the padding or dye liquor. To the contrary, for the acetylene glycol has in addition a pronounced defoaming action.

Accordingly, the present invention relates to solid formulations of dyes which are sparingly soluble or insoluble in water, which formulations contain a dialkyl sulfosuccinate having 3 to 8 carbon atoms in each alkyl moiety, or a $C_3$-$C_6$alkylnaphthalenesulfonate and/or a branched or unbranched acetylene glycol containing 8 to 20 carbon atoms, in addition to the dye and one or more anionic dispersants, optionally together with further auxiliaries conventionally employed in powdered formulations.

By dyes which are sparingly soluble or insoluble in water are meant those dyes which have a water solubility of less than 1 g/l at 20° C. Such dyes are e.g. sulfur dyes or pigment dyes, but are preferably disperse dyes and, most preferably, vat dyes, which belong chemically to a very wide variety of classes.

The disperse dyes are e.g. nitro, aminoketone, ketonimine, methine, polymethine, diphenylamine, quinoline, benzimidazole, xanthene, oxazine, aminonaphthoquinone or coumarin dyes, which do not contain carboxylic acid and/or sulfonic acid groups, and are in particular anthraquinone and azo dyes such as mono- or disazo dyes. The vat dyes are dyes which are applied in solid dispersed form to the fabric and, after development, are again present in water-insoluble form.

Representative examples of vattable polycyclic quinones are: perylenetetracarboximides, in particular the phenylimides, anthrapyrimidines, anthrapyridones, isothiazolanthrones, quinazolinanthraquinones, oxazolanthraquinones, thiazolanthraquinones, oxdiazolanthraquinones, anthraquinonyltriazoles, pyrazolanthraquinones, dipyrazolanthronyls, pyrazinoanthraquinones, azabenzanthrones, indanthrones, thioxanthronanthraquinones, anthrimides, anthrimidecarbazoles, dihydroacridines, anthanthrones, pyranthrones, flavanthrones, acedianthrones and, in particular, anthraquinonacridones and the anthraquinones themselves, comprising not only derivatives containing pure 9,10-dioxoanthracene rings but also those containing thiophanthrone radicals and the like, as well as anthraquinone compounds which contain 9,10-dioxoanthracene rings. All these polycyclic compounds can carry the customary substituents of vat dyes, in particular chlorine, fluorine or bromine atoms, and alkyl, alkoxy, aryl, aryloxy, aralkyl, aralkoxy, carbalkoxy, arylamino, alkylmercapto, arylmercapto, cyano and thiocyano groups. Alkyl denotes in particular radicals containing 1 to 4 carbon atoms and aryl denotes in particular radicals such as phenyl, toluyl, chlorophenyl, methoxyphenyl or naphthyl radicals; and aralkyl is preferably the benzyl radical. Particularly important substituents are furthermore the acyl and acylamino group.

In addition to individual dyes, the formulations of this invention can contain mixtures of dyes. Such mixtures may also be combinations of dyes which are insoluble or sparingly soluble in water, if it is desired to dye blended fabrics, for example polyester/cotton blends.

Suitable anionic dispersants are in particular lignosulfonates, e.g. those obtained by the sulfite or kraft process. They are preferably products which are partially hydrolysed, oxidised or desulfonated or, if they have been obtained by the kraft process, are post-sulfonated or sulfomethylated, and are fractionated by known methods, e.g. according to molecular weight or degree of sulfonation. Mixtures of sulfite- and kraft-lignosulfonates are also very effective. Particularly suitable lignosulfonates are those having an average molecular weight from 1000 to 80,000, an active lignosulfonate content of at least 80% and preferably a low content of polyvalent cations. The degree of sulfonation may vary within wide limits. The ratio of carbon to organically bound sulfur is e.g. from 9:1 to 55:1.

It is preferred to use those lignosulfonates in which the ratio of carbon to organically bound sulfur is 17:1 to 40:1.

Useful anionic dispersants for the formulations of this invention are also condensates of aromatic sulfonic acids and formaldehyde, in particular condensates of formaldehyde and naphthalenesulfonic acids, and also condensates of formaldehyde, naphthalenesulfonic acid and benzenesulfonic acid, or a condensate of crude cresol, formaldehyde and naphthalenesulfonic acid. Further anionic dispersants are sulfated alkylene oxide adducts, sulfated, partially esterified polyhydric alcohols, alkylsulfonates, condensates of ditolyl ether, formaldehyde and sulfuric acid, condensates of chloromethylolated diphenyls, naphthalene and sulfuric acid, condensates of monocyclic aromatic compounds, formaldehyde, naphtholsulfonic acids and, if appropriate, sodium sulfite, or condensates of naphthalene, toluene, formaldehyde and sulfuric acid.

It is preferred to use mixtures of the above-mentioned anionic dispersants, in particular a mixture of the condensate of formaldehyde and naphthalenesulfonic acid, and/or lignosulfonate and/or oxylignosulfonate.

The anionic dispersants will normally be in the form of their alkali salts, ammonium salts or water-soluble amine salts.

Examples of suitable dialkyl sulfosuccinates, the alkyl moieties of which may be straight chain or branched and contain 3 to 8 carbon atoms, are: dipropyl sulfosuccinate, diisopropyl sulfosuccinate, diisobutyl sulfosuccinate, dipentyl sulfosuccinate, dihexyl sulfosuccinate, diheptyl sulfosuccinate, bis(2-ethylhexyl) sulfosuccinate and dioctyl sulfosuccinate. Preferred dialkyl sulfosuccinates are dipentyl sulfosuccinate, in particular dihexyl sulfosuccinate and bis(2-ethylhexyl) sulfosuccinate.

Instead of a dialkyl sulfosuccinate it is also possible to use an alkylnaphthalenesulfonate, the alkyl moiety of which has a chain of 3 to 6 carbon atoms and is branched or unbranched. A suitable contender is, for example, isopropylnaphthalenesulfonate.

Both the dialkyl sulfosuccinate and the alkylnaphthalenesulfonate are conveniently used in the form of their alkali metal salts, for example as sodium salt.

It has, however, proved especially advantageous to use acetylene glycols containing in all 8 to 20 carbon atoms in the carbon backbone and preferably with a central triple bond. Such compounds, which belong to the group of nonionic surfactants, are relatively low-foaming in spite of their excellent wetting action and, in addition, appreciably lower the viscosity of the milled slurry. It is thereby possible to carry out the wet grinding with dyestuff suspensions having a high solids content. The viscosity of the dyestuff suspension also remains low during grinding and, at the conclusion of the grinding operation, can be easily fed into the drying tower, while less water has to be evaporated on account of the high solids content. The addition of acetylene glycol thus effects a better utilisation of the grinding capacity, i.e. a better space-time yield and a substantial saving of energy in the drying step.

The acetylene glycols are for example the following compounds: 4-octyne-3,6-diol, 2,7-dimethyl-4-octyne-3,6-diol, 3,6-dimethyl-4-octyne-3,6-diol, 5-decyne-4,7-diol, 2,9-dimethyl-5-decyne-4,7-diol, 4,7-dimethyl-5-decyne-4,7-diol, 2,4,7,9-tetramethyl-5-decyne-4,7-diol or 2,5,8,11-tetramethyl-6-dodecyne-5,8-diol. The branched acetylene glycols are preferred, in particular 2,4,7,9-tetramethyl-5-decyne-4,7-diol and 3,6-dimethyl-4-octyne-3,6-diol.

The acetylene glycol can be used in combination with the dialkyl sulfosuccinate or the alkylnaphthalenesulfonate. However, a sufficient effect is often obtained using the acetylene glycol alone. Accordingly, preferred dye formulations contain a divalent branched acetylene glycol of 8 to 12 carbon atoms in addition to the dye, a formaldehyde/naphthalenesulfonic acid condensate and/or a lignosulfonate and/or an oxylignosulfonate, and optionally further auxiliaries.

Further, formulations having good dispersibility and wettablity are obtained by using a dialkyl sulfosuccinate containing 3 to 8 carbon atoms in the alkyl moiety, optionally in combination with other auxiliaries and together with a naphthalenesulfonic acid/formaldehyde condensate and/or a lignosulfonate and/or an oxylignosulfonate.

The dialkyl sulfosuccinate and alkylnaphthalenesulfonate are conveniently added to the formulations of the invention in an amount of 1 to 15% by weight, preferably 3 to 8% by weight, and the acetylene glycol is added in an amount of 0.5 to 12% by weight, preferably 3 to 6% by weight, in each case based on the total weight of the final formulation.

The formulations may contain, as further auxiliaries, for example antifoams based on higher alcohols or mineral oils, and fillers such as sodium sulfate, glucose or dextrin, and/or dust inhibitors, for example based on mineral oils.

The dye formulations have for example the following composition:

25 to 65% by weight of dye,
20 to 60% by weight of a mixture of anionic dispersants,
1 to 15% by weight of dialkyl sulfosuccinate, and/or
0.5 to 12% by weight of acetylene glycol, and optionally
0.1 to 20% by weight of further auxiliaries.

To sum up, the formulations of this invention exhibit insignificant foaming in water, have very good dispersibility and very good redispersibility. In addition, they have good dispersion stability in dyebaths.

The dye formulations are prepared for example by suspending the dye which is insoluble or sparingly soluble in water by adding one or more anionic dispersants and subjecting the suspension to a wet grinding until the average particle size is $\leq 5$ $\mu$m. The wet grinding is carried out for example in a stirred ball mill or in a sand mill.

The dyestuff dispersion so obtained is then dried. The remaining components, for example additional anionic dispersants such as lignosulfonate, which is also added as filler, and, in particular, the dialkyl sulfosuccinate, alkylnaphthalenesulfonate and acetylene glycol, are added to the solids suspension before drying or else before or during the grinding operation. In particular, the acetylene glycol is preferably added to the milled slurry to lower the viscosity.

Suitable drying units are spray driers, fluidised bed granulators, thin-layer contact driers, e.g. roller driers or also continuous paddle driers. It is preferred to remove water from the dyestuff dispersion up to an insignificant content of residual moisture by means of a spray drier.

For spray drying or spray granulating, the dyestuff suspension containing the auxiliaries is fed into the spray tower by means of a device suitable for producing drops of the desired size (e.g. a jet, pressure jet, pneumatic jet or rotating atomiser). The gas entry temperature of the drier is about 130°–200° C., and the gas outlet temperature is from 60°–110° C. Drying is carried out such that the temperature of the product does not exceed a specific critical limit above which the dye granulate undergoes irreversible changes. In particular, care must be taken that no agglomeration of dye particles occurs, for this would mean that the degree of dispersibility of the suspension of the formulation in water is substantially lower than before drying.

The dye formulations of this invention are used for the preparation of dyebaths, padding liquors or printing pastes which are suitable for dyeing and printing natural or synthetic fibre materials, e.g. textile material made from cotton, polyester, viscose, and also cotton/polyester blends.

The invention is illustrated by the following Examples, in which parts and percentages are by weight. Viscosities were measured with a Brookfield viscosimeter, type LVT, at 30 rpm using spindle 4.

The tests for determining the wettability and foaming properties of the formulations are carried out as follows:

Mechanical test for determining the cold water dispersibility and solubility 5 g of dye granulate or powder are placed on a perforated steel disc which is maintained in a horizontal position by a lifting mechanism in a 100 ml glass beaker filled with 50 ml of demineralised water. The diameter of the steel disc is such that the disc just reaches the wall of the glass beaker. The temperature of the water is 25°–30° C. After waiting for 30 seconds until the dye granulate has deposited onto the immersed steel disc, the lifting mechanism is set in motion (30 lifts/minute, dead centre lies above the surface of the water). The steel disc is examined and the time until no more dye is detectable on the steel disc is determined. The dispersing time is evaluated as follows in accordance with the requirements of practice made of dye granulates:

up to 5 minutes: good
5 to 10 minutes: moderate
>10 minutes: poor.

Foam test

The foaming properties of the formulations are determined by the method of A. N. Derbyshire and A. T. Leaver (JSDC 253, August 1975). The test is carried out at a temperature of 30° C. Foam development is assessed by measuring the height of the foam after circulation for 5 minutes and the foam stability by measuring the height of the foam after a further 5 minutes without circulation. The values so obtained are expressed in mm as a pair of values separated by a stroke.

EXAMPLE 1

1620 parts of the dry and precomminuted dye of the formula

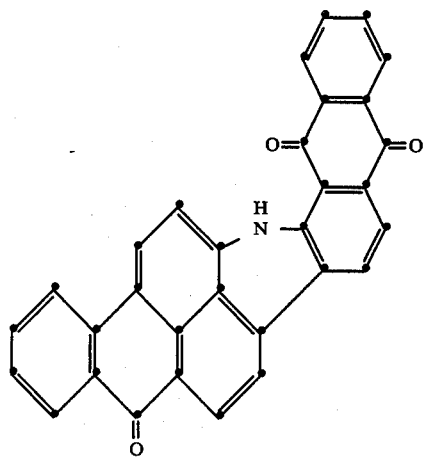

are thoroughly mixed with 944 parts of a naphthalenesulfonic acid/formaldehyde condensate (as 42.9% aqueous solution) and 438 parts of oxylignosulfonate (as powder with a dry weight of 92.6%) in 3000 parts of water in a homogeniser. After this mixing/predispersing the size of the individual dye particles should not be greater than 80 μm. The pH of the suspension is adjusted to 7.6 by addition of about 92 parts of concentrated sulfuric acid. The pH adjustment can also be made with naphthalenesulfonic acid/formaldehyde condensate (as free acid) instead of sulfuric acid. Then 30 parts of 3,6-dimethyl-4-octyne-3,6-diol are added to the somewhat creamy, viscous stirred suspension. This addition has the effect of appreciably lowering the viscosity and the suspension immediately becomes substantially more mobile. The acetylene glycol thus acts as an excellent grinding auxiliary by means of which the solids content of the milled material can be appreciably increased. Without this substance, the batch would have to be strongly diluted (up to 20%), which is uneconomic (longer grinding time, lower space-time yield and, in addition, a large amount of water would have to be evaporated when drying).

The subsequent wet grinding of the dye is carried out in a stirred ball mill and is complete after about 13 hours when the average particle size is about 1 μm. The viscosity of the slurry remains low up to the end (dry weight about 42%). Before drying, 505 parts of glucose are added as filler. Drying is carried out in a spray drier at a maximum air entry temperature of 130°–140° C. and a maximum air outlet temperature of 70°–75° C.

The flowable, abrasion-resistant granular dye formulation has the following composition:
51.9% of dye
13.0% of naphthalenesulfonic acid/formaldehyde condensate
13.0% of oxylignosulfonate
16.1% of glucose
1.0% of 3,6-dimethyl-4-octyne-3,6-diol
5.0% of residual moisture.

The formulation has excellent dispersibility and wettability (2 minutes in the mechanical test) and in practice exhibits only insignificant foaming (foam test: 20 mm/0 sms).

A lignosulfonate can also be used as filler instead of glucose. A formulation with the same good dispersibility and wettability is also obtained by replacing 3,6-dimethyl-4-octyne-3,6-diol with one of the following glycols: 2,4,7,9-tetramethyl-5-decyne-4,7-diol, 4,7-dimethyl-5-decyne-4,7-diol or 2,9-dimethyl-5-decyne-4,7-diol.

The dispersibility and wettability of the formulation can be further improved by adding to the slurry 2 to 8% (based on the final formulation) of sodium dihexylsulfosuccinate or isopropylnaphthalenesulfonate. Further suitable auxiliaries are antifoams (e.g. based on paraffin oil) and dust inhibitors, which are used in an amount of 0.2 to 1.5%. The addition of a dust inhibitor can be dispensed with in the case of good separation of finely ground product during or after the drying operation.

EXAMPLE 2

Upon completion of grinding, 33.3 parts of lignosulfonate (aqueous solution with a solids content of 46.4%), 6.6 parts of sodium dihexylsulfosuccinate (80%) and 7.3 parts of water are added to 300 parts of a slurry (average particle size about 1 μm) consisting of 24.4% of dye (the same dye as in Example 1), 6.1% of naphthalenesulfonic acid/formaldehyde condensate, 6.1% of oxylignosulfonate and 0.5% of 3,6-dimethyl-4-octyne-3,6-diol, and the mixture is thoroughly homogenised. The slurry is then passed through a sieve (mesh size 24–26 μm) and dried in a spray drier (maximum values for air entry and outlet temperature as in Example 1). A flowable, abrasion-resistant granular formulation of the following composition is obtained:

52.65% of dye
  13.15% of naphthalenesulfonic acid/formaldehyde condensate
  13.15% of oxylignosulfonate
  11.15% of lignosulfonate
  1.10% of 3,6-dimethyl-4-octyne-3,6-diol
  3.8% of dihexyl sulfosuccinate
  5.0% of residual moisture.

The formulation has excellent dispersibility and wettability (3 min. in the mechanical test) and foams insignificantly in practice (foam test: 50 mm/rapid collapse).

By adding 0.8% of an antifoam to the slurry at the expense of the sulfite lye, the formulation obtained after drying is virtually non-foaming and fully retains its good dispersibility and wettability.

EXAMPLE 3

672 parts of the dye employed in Example 1 (salt-containing crude dye) are stirred and predispersed with 168.4 parts of naphthalenesulfonic acid/formaldehyde condensate (393.5 parts of an aqueous solution with a solids content of 42.8% are used), 168.3 parts of oxylignosulfonate (as 92.2% powder), 13.4 parts of 3,6-dimethyl-4-octyne-3,6-diol and 1240 parts of water until the particle size is <80 to 100 μm. The pH of the suspension is adjusted to 8.2 with 29.4 parts of 96% sulfuric acid. The low viscosity suspension is ground for 8 hours in a sand mill (viscosity 3640 cP). The average particle size is ≦1 μm. 508.7 parts of the dispersion (41% solids content) are thoroughly mixed with 24.7 parts of lignosulfonate (56.3 parts of a 43.9% aqueous solution), 13.8 parts of dihexyl sulfosuccinate, 2.8 parts of an antifoam and 43.4 parts of water. After it has been sieved to remove coarse particles (mesh size 18 to 21 μm), the suspension is spray dried (air entry temperature 130° C./air outlet temperature 60°–65° C.). The dye formulation so obtained is free from dye agglomerates—speck-free dyeings—and has the following composition:

51.49% of dye
  12.90% of naphthalenesulfonic acid/formaldehyde condensate
  12.90% of oxylignosulfonate
  9.45% of lignosulfonate
  1.03% of 3,6-dimethyl-4-octyne-3,6-diol
  4.22% of dihexyl sulfosuccinate
  3.14% of sodium sulfate
  1.07% of antifoam
  3.80% of water.

The formulation has good wettability/dispersibility and redispersibility and, in particular, is non-foaming (foam test: 0 mm/0 mm).

If the dye suspension is ground without the addition of 3,6-dimethyl-4-octyne-3,6-diol, the slurry thickens to a gelatinous mass after about 7 hours and has to be diluted with water (viscosity: 9240 cP).

EXAMPLE 4

To 221.8 parts of a slurry containing 39.5 parts of the dye of the formula

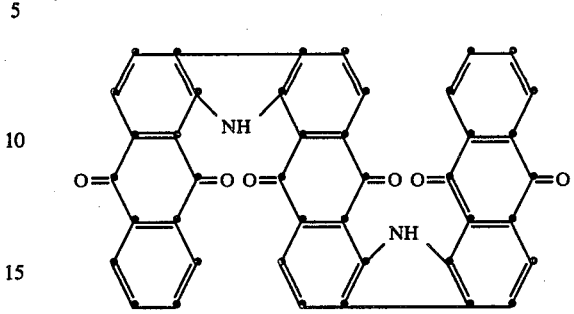

and 11.8 parts of lignosulfonate, which slurry has been ground in a sand mill to an average particle size of about 1 μm, are added 29.5 parts of lignosulfonate as aqueous solution (46.7% solids content), 60.9 parts of naphthalenesulfonic acid/formaldehyde condensdate (aqueous solution with a solids content of 42.9%), 14.1 parts of oxylignosulfonate (92.6% solids content), 5.5 parts of 3,6-dimethyl-4-octyne-3,6-diol and 35.9 parts of water, and the batch is thoroughly homogenised. A finely dispersed suspension with a solids content of about 30% is obtained. This suspension is spray dried after passage through a sieve with a mesh size of 18 to 21 μm as described in Example 1. Then 0.1% of a mineral oil-based dust inhibitor is added to remove dust.

The final formulation has the following composition:
  34.2% of dye
  22.6% of naphthalenesulfonic acid/formaldehyde condensate
  11.3% of oxylignosulfonate
  22.1% of lignosulfonate
  4.7% of 3,6-dimethyl-4-octyne-3,6-diol (the content of acetylene glycol is somewhat below the indicated value, as a portion evaporates during spray drying)
  0.1% of dust inhibitor
  5.0% (approx.) of residual moisture.

The formulation has good dispersibility. Wettability, dispersibility, foaming properties and redispersibility can be further improved by replacing the acetylene glycol with dihexyl sulfosuccinate and adding 0.8% of an antifoam. After spray drying, a formulation having the following composition is obtained:
  32.9% of dye
  21.8% of naphthalenesulfonic acid/formaldehyde condensate
  10.9% of oxylignosulfonate
  about 24% of lignosulfonate
  about 4.6% of dihexyl sulfosuccinate
  about 0.8% of antifoam
  about 5% of residual moisture.

The formulation is low-foaming and readily wettable (mechanical test: 3 to 5 minutes; foam test: 10 mm/0 mm).

EXAMPLE 5

To 216.3 parts of a slurry with an average particle size of about 0.9 to 1 μm and containing 38.0 parts of the dye of the formula

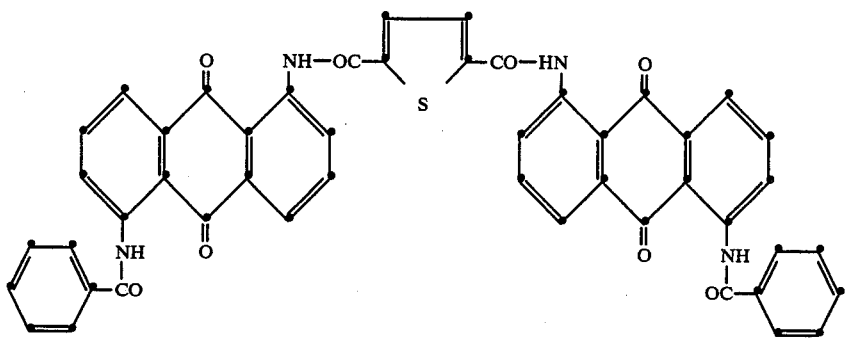

28.5 parts of naphthalenesulfonic acid/formaldehyde condensate, and 7 parts of oxylignosulfonate, are added 51.5 parts of lignosulfonate (aqueous solution, 46.6% solids content), 2.5 parts of 3,6-dimethyl-4-octyne-3,6-diol and 63 parts of water. The batch is well homogenised to give a finely dispersed suspension with a solids content of about 30% which is dried after being passed through a 24-26 μm sieve (air entry temperature 160° C./air outlet temperature 80°-85° C.). To remove dust, 0.14% of a mineral oil-based dust inhibitor is added.

The formulation has the following composition:
36.0% of dye
27.0% of naphthalenesulfonic acid/formaldehyde condensate
6.6% of oxylignosulfonate
22.8% of lignosulfonate
2.4% of 3,6-dimethyl-4-octyne-3,6-diol
0.1% of dust inhibitor
about 5% of residual moisture.

The content of acetylene glycol is somewhat below the indicated value, as a portion evaporates during the spray drying.

The formulation has good dispersibility and wettability (mechanical test: 5 to 6 minutes).

EXAMPLE 6

To the suspension of Example 5 are added 7.2 parts of oxylignosulfonate, 14.3 parts of lignosulfonate (46.4% aqueous solution), 5 parts of sodium dihexyl sulfosuccinate (80% aqueous/alcoholic solution) and 73.4 parts of water. The slurry is sieved and spray dried, affording a dye formulation of the following composition:
36.39% of dye
13.60% of oxylignosulfonate
27.29% of naphthalenesulfonic acid/formaldehyde condensate
13.69% of lignosulfonate
3.83% of sodium dihexyl sulfosuccinate
0.2% of dust inhibitor
5.0% of water.

The formulation has excellent wettability/dispersibility and redispersibility (mechanical test: 3 min).

EXAMPLE 7

7800 parts of the dye of the formula

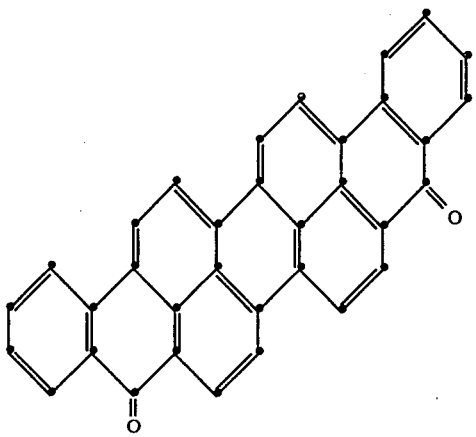

(as moist filter cake with a solids content of 27.9%) are stirred in 2335 parts of a 46.6% aqueous lignosulfonate solution and predispersed with a jet mixer. The dispersion is then comminuted (sand mill; rate of flow of the slurry: 22-25 l/h). After grinding for 9 hours the average particle size is about 1 μm. To 230 parts of the low viscosity slurry containing 48.5 parts of dye and 24.4 parts of lignosulfonate are added 29.6 parts of a 44.3% aqueous solution of a naphthalenesulfonic acid/formaldehyde condensate, 14.2 parts of oxylignosulfonate (92.6% solids content), 5.3 parts of 3,6-dimethyl-4-octyne-3,6-diol, 2.13 parts of C.I. Vat Green 1 (C.I. 59825) as shading component and 21.8 parts of water. After thorough mixing, the low viscosity suspension (solids content 35.2%) is sieved and spray dried and 0.1% of a dust inhibitor is added to the fine powder so obtained. The dye formulation so obtained has the following composition:
43.2% of dye
21.7% of lignosulfonate
11.7% of naphthalenesulfonic acid/formaldehyde condensate
11.7% of oxylignosulfonate
4.7% of 3,6-dimethyl-4-octyne-3,6-diol
1.9% of C.I. Vat Green 1 (C.I. 59825)
0.1% of dust inhibitor
5.0% of water.

The formulation has good wettability/dispersibility and redispersibility (mechanical test: 5 to 6 min) and good foaming properties (foam test: <10 mm/rapid collapse).

By replacing 5.3 parts of 3,6-dimethyl-4-octyne-3,6-diol with 5.3 parts of sodium dihexyl sulfosuccinate and adding 0.8 to 1% of an antifoam, a formulation is obtained with excellent dispersibility/wettability (mechanical test: 3 min) and good foaming properties (foam test: 10 mm/rapid collapse).

EXAMPLE 8

3071.3 parts of crude dye of the formula

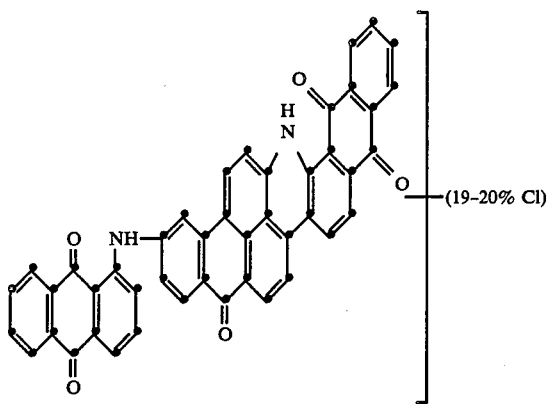

(as moist filter cake with 16.3% solids content) are suspended in 292.4 parts of a 42.8% aqueous solution of a naphthalenesulfonic acid/formaldehyde condensate together with 136.3 parts of oxylignosulfonate (91.8% solids content) and predispersed with a jet mixer to a particle size of <80 to 100 μm. The subsequent comminution is complete after 7¼ hours, when the average particle size is <1 μm. To 177 parts of this suspension, containing 26.2 parts of dye, 6.6 parts of naphthalenesulfonic acid/formaldehyde condensate and 6.6 parts of oxylignosulfonate, are added 77.2 parts of a 42.8% aqueous solution of naphthalenesulfonic acid/formaldehyde condensate, 14.4 parts of oxylignosulfonate (91.8% solids content), 6 parts of sodium dihexyl sulfosuccinate, 2 parts of an antifoam, 6.4 parts of a shading dye (finished preparation) and 80.3 parts of water. The suspension so obtained is thoroughly mixed, sieved, and finally spray dried (air entry temperature 130° C./air outlet temperature 60°-70° C.). To remove dust, 0.2% of a dust inhibitor is added to the dry formulation. The formulation has the following composition:
- 25.1% of dye
- 38.0% of naphthalenesulfonic acid/formaldehyde condensate
- 19.0% of oxylignosulfonate
- 4.6% of sodium dihexyl sulfosuccinate
- 1.9% of antifoam
- 6.2% of shading dye
- 0.2% of a mineral oil-based dust inhibitor
- 5.0% of water.

The formulation has very good dispersibility, wettability and redispersibility (mechanical test: 4 min) and good foaming properties (foam test: 30 mm/0 mm).

EXAMPLE 9

To 220 parts of a slurry containing 33.59 parts of the dye of Example 4, 12.15 parts of oxylignosulfonate (91.6% solids content) and 52.53 parts of naphthalenesulfonic acid/formaldehyde condensate (aqueous solution with a solids content of 42.3%), which slurry has been obtained by grinding in a sand mill to an average particle size of about 1 μm, are added 49.91 parts of lignosulfonate (aqueous solution with a solids content of 43.6%), 4.7 parts of isopropylnaphthalenesulfonate (as sodium salt with an active ingredient content of 75%; remainder sodium sulfate) and 36.7 parts of water. The batch is thoroughly homogenised to give a fine suspension with a solids content of about 30%. This suspension is passed through an 18-21 μm sieve and spray dried as described in Example 1 (air entry temperature 150° C./air outlet temperature 70°-80° C.). To remove dust, 0.1% of a mineral oil-based dust inhibitor may subsequently be added. Composition of the final formulation:
- 34.2% of dye
- 22.6% of naphthalenesulfonic acid/formaldehyde condensate
- 11.3% of oxylignosulfonate
- 22.1% of lignosulfonate
- 4.8% of isopropylnaphthalenesulfonate, sodium salt (with a 25% content of $Na_2SO_4$)
- 5.0% of water.

The formulation has a moderate dispersibility and wettability (mechanical test: 9 min. as against 16 min. for the comparison product without isopropylnaphthalenesulfonate. In the comparison formulation, isopropylnaphthalenesulfonate was replaced by lignosulfonate). Excellent foaming properties are imparted by adding 0.8% of an antifoam to the formulation (foam test: 0/0 mm).

By adding 5% of sodium diisobutylnaphthalenesulfonate (65% of active ingredient; remainder $Na_2SO_4$) instead of isopropylnaphthalenesulfonate, a readily dispersible solid physical form is also obtained after addition of a dust inhibitor (mechanical test: 9 min.).

By adding 0.8 to 1.2% of an antifoam to the slurry at the expense of the lignosulfonate, the formulation obtained after spray drying has good foaming properties (foam test: 35/0 mm; foam collapses after 2 minutes).

EXAMPLE 10

The isopropylnaphthalenesulfonate employed in Example 9 is replaced by 5% of bis(2-ethylhexyl) sulfosuccinate (as sodium salt) to give a readily dispersible formulation (mechanical test: 8 minutes). The foaming properties can be improved by adding 0.8% of an antifoam. The foam that forms after preparing the dye liquor collapses rapidly.

EXAMPLE 11

To 210 parts of a slurry containing 46.1 parts of the dye of Example 7, 13.59 parts of oxylignosulfonate (91.6% solids content) and 29.43 parts of naphthalenesulfonic acid/formaldehyde condensate (aqueous solution with a 42.3% solids content), which slurry has been ground in a sand mill to an average particle size of about 0.9-1 μm, are added 57.89 parts of lignosulfonate (aqueous solution with a 43.6% solids content), 5.1 parts of isopropylnaphthalenesulfonate (sodium salt; 75% active ingredient, remainder sodium sulfate) and 64.8 parts of water. The batch is thoroughly homogenised and the low viscosity, finely dispersed suspension (solids content 30%) is sieved and spray dried (air entry temperature 150° C./air outlet temperature 70°-80° C.). To remove dust, about 0.1% of a mineral oil-based dust inhibitor may be added. Composition of the final formulation:
- 43.2% of dye
- 11.7% of naphthalenesulfonic acid/formaldehyde condensate
- 11.7% of oxylignosulfonate
- 23.6% of lignosulfonate 4.8% of isopropylnaphthalenesulfonate, sodium salt (containing 25% of Na$_2$SO$_4$)

5.0% of water.

The formulation is readily dispersible (mechnical test: 8 minutes, as against 13 minutes for the comparison formulation in which isopropylnaphthalenesulfonate was replaced by lignosulfonate) and has very good foaming properties (30/0 mm; foam collapses after 1 minute).

By adding 5% of sodium diisobutylnaphthalenesulfonate instead of isopropylnaphthalenesulfonate, the spray dried formulation has good dispersibility and wettability (mechanical test: 5 minutes) and very good foaming properties (40/0 mm).

EXAMPLE 12

5% of bis(2-ethylhexyl)sulfosuccinate (sodium salt) and 1 to 1.5% of an antifoam are used instead of the isopropylnaphthalenesulfonate employed in Example 11 (and partly at the expense of the lignosulfonate). After spray drying, a solid, readily dispersible physical form is obtained (mechanical test: 7 min.; fairly good foaming properties, with rapid collapse of foam).

What is claimed is:

1. A solid formulation of a vat dye, which formulation contains a dialkyl sulfosuccinate having 3 to 8 carbon atoms in each alkyl moiety, and/or a branched or unbranched acetylene glycol containing 8 to 20 carbon atoms, in addition to the dye and one or more anionic dispersants, optionally together with further auxiliaries conventionally employed in powdered formulations.

2. A dye formulation according to claim 1, which contains 1 to 15% by weight, of a dialkyl sulfosuccinate, and/or 0.5 to 12% by weight, of an acetylene glycol, in each case based on the total weight of said formulation.

3. A dye formulation according to claim 1, wherein the anionic dispersant is a naphthalenesulfonic acid/formaldehyde condensate, and/or a lignosulfonate and/or an oxylignosulfonate.

4. A dye formulation according to claim 1, wherein the dialkyl sulfosuccinate is dipentyl sulfosuccinate, dihexyl sulfosuccinate, or bis(2-ethylhexyl) sulfosuccinate.

5. A dye formulation according to claim 1, wherein the acetylene glycol is 2,4,7,9-tetramethyl-5-decyne-4,7-diol or 3,6-dimethyl-4-octyne-3,6-diol.

6. A dye formulation according to claim 1, which contains a branched acetylene glycol of 8 to 12 carbon atoms, in addition to containing a naphthalenesulfonic acid/formaldehyde condensate and/or a lignosulfonate and/or an oxylignosulfonate, optionally together with other auxiliaries.

7. A dye formulation according to claim 1, which contains a dialkyl sulfosuccinate in which each alkyl moiety contains 3 to 8 carbon atoms, in addition to containing a naphthalenesulfonic acid/formaldehyde condensate and/or a lignosulfonate and/or an oxylignosulfonate, optionally together with other auxiliaries.

8. A dye formulation according to claim 1, which contains an antifoam, a filler and/or a dust inhibitor as further auxiliaries.

9. A solid dye formulation according to claim 1, which contains
   25 to 65% by weight of dye,
   20 to 60% by weight of a mixture of anionic dispersants,
   1 to 15% by weight of a dialkyl sulfosuccinate and/or
   0.5 to 12% by weight of an acetylene glycol, and optionally
   0.1 to 20% by weight of further auxiliaries.

10. A process for the preparation of a dye formulation as claimed in claim 1, which comprises suspending the dye in water with the addition of one or more anionic dispersants, then grinding the suspension so obtained to an average particle size of ≦5 μm and drying the aqueous dispersion, the remaining components being added before, during or after the grinding operation.

11. A process according to claim 11, which comprises converting the aqueous dye dispersion into a granular formulation by spray drying.

12. A process for dyeing or printing natural or synthetic fiber materials, which comprises contacting said materials with a dye bath, padding liquor or printing paste prepared from a dye formulation of claim 1.

13. A dye formulation according to claim 1, which contains 3 to 8% by weight of a dialkyl sulfosuccinate and/or 3 to 6% by weight of an acetylene glycol, in each case based on the total weight of said formulation.

* * * * *